Figure 1:
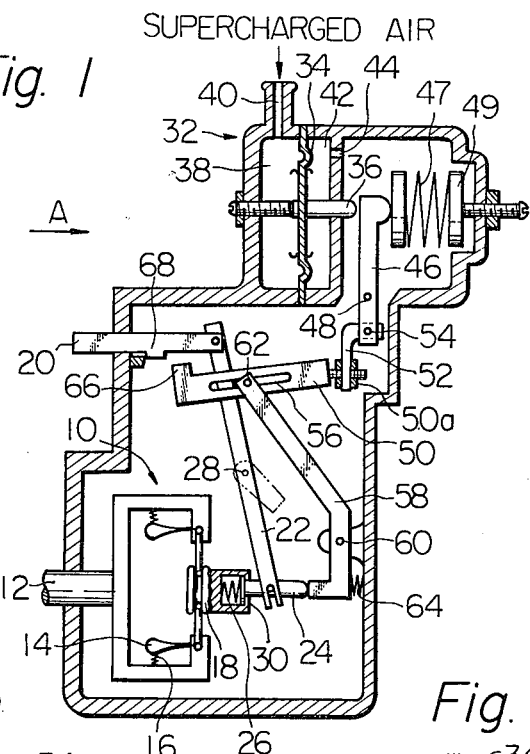

United States Patent [19]

Okura et al.

[11] 4,015,573
[45] Apr. 5, 1977

[54] SUPERCHARGED DIESEL ENGINE FUEL INJECTION PUMP GOVERNOR ASSEMBLY

[75] Inventors: Rikuo Okura, Kawagoe; Yasuhide Suzuki, Okabe, both of Japan

[73] Assignee: Diesel Kiki Co., Ltd., Tokyo, Japan

[22] Filed: Feb. 14, 1974

[21] Appl. No.: 442,467

[30] Foreign Application Priority Data

Mar. 5, 1973  Japan .................. 48-26587[U]

[52] U.S. Cl. ................ 123/140 MP; 123/140 MC
[51] Int. Cl.² ................... F02D 1/04; F02D 1/06
[58] Field of Search ............. 123/140 MC, 140 MP, 123/140 R

[56] References Cited

UNITED STATES PATENTS

| | | | |
|---|---|---|---|
| 2,663,289 | 12/1953 | Links | 123/140 MP |
| 2,758,584 | 8/1956 | Hogeman et al. | 123/140 R |
| 2,767,700 | 10/1956 | Parks | 123/140 R |
| 2,807,252 | 9/1957 | Downing | 123/140 R |
| 3,530,845 | 9/1970 | Staudt et al. | 123/140 R |
| 3,572,304 | 3/1971 | Becker et al. | 123/140 MP |
| 3,707,144 | 12/1972 | Galis et al. | 123/140 R X |
| 3,795,233 | 3/1974 | Crews et al. | 123/140 MP X |

FOREIGN PATENTS OR APPLICATIONS

| | | | |
|---|---|---|---|
| 1,171,201 | 5/1964 | Germany | 123/140 MC |

*Primary Examiner*—C. J. Husar
*Assistant Examiner*—Tony M. Argenbright
*Attorney, Agent, or Firm*—Frank J. Jordan

[57] ABSTRACT

A manual speed control member and a centrifugal governor act in combination to select a desired position for a fuel injection pump control rod to control the fuel injection volume. A pressure sensitive unit acts to limit movement of the control rod in a direction to increase the fuel injection volume to a point where maximum power is obtainable but smoky exhaust is prevented. The pressure sensitive unit is automatically disconnected from the control rod to provide maximum fuel injection volume for starting the engine.

12 Claims, 5 Drawing Figures

SUPERCHARGED DIESEL ENGINE FUEL INJECTION PUMP GOVERNOR ASSEMBLY

The present invention relates to a governor assembly for a fuel injection pump for a supercharged Diesel engine which provides continuous and correct regulation of the fuel injection volume over the entire operating speed range of the engine, and an automatic mechanism for providing a maximum fuel injection volume for starting the engine.

As is well known in the art, the output power which is practically available from a Diesel engine is limited by, among other factors, the amount of fuel which may be burned with a given amount of air without producing smoky exhaust gases. In order to produce more output power in combination with clean exhaust gases, it has been a common practice to equip Diesel engines with superchargers. Since a supercharger increases the amount of air available in the engine cylinders for combustion with fuel, the amount of fuel which can be injected into the cylinders can be increased without producing smoky exhaust gases, and hence the power output of the engine can be increased. Thus, the maximum fuel injection volume is a function of the pressure of supercharged air being supplied into the engine from the supercharger. It has also been a common practice to provide centrifugal governors for Diesel engine fuel injection pumps, in order to provide a suitable fuel injection volume at varying engine speeds and loads. However, a manual speed control member is also provided to select the desired engine speed, which operates in combination with the centrifugal governor. Especially when the speed control member is moved so as to demand a rapid increase in engine speed, a fuel injection volume may be designated which would produce a smoky exhaust, because the supercharger cannot supply enough air at that point to cleanly burn the designated amount of fuel. For this reason, a pressure sensitive device is provided in conjunction with the centrifugal governor to limit the fuel injection volume to a level which can be accommodated by the supercharger.

However, in prior art governors of this type, it has been a problem that the pressure sensitive device excessively limits the fuel injection volume while the engine is being started, with the result that insufficient fuel is injected into the engine to start it. This problem has been overcome by means of manual devices to temporarily disengage the pressure sensitive device during starting of the engine, but these are a nuisance to operate, and are frequently left in their actuated positions for a period of time after the engine has been started to produce smoky exhaust gases which pollute the environment and waste valuable fuel through provision of an excessively rich fuel mixture.

It is therefore an important object of the present invention to provide a governor assembly for a fuel injection pump for a supercharged Diesel engine which continuously provides an efficient fuel injection volume over the entire operating speed range of the engine.

It is another important object of the present invention to provide a governor assembly for a fuel injection pump for a supercharged Diesel engine which incorporates a mechanism to automatically provide a maximum fuel injection volume for starting the engine, and to decrease the fuel injection volume to an efficient operating level immediately after the engine has been satisfactorily started to prevent waste of fuel.

It is still another important object of the present invention to provide a governor assembly for a fuel injection pump for a supercharged Diesel engine which prevents discharge of smoky exhaust gases from the engine under all productive operating conditions of the engine to reduce the pollutive effect of the engine on the environment.

The above and other objects, features and advantages of the present invention will become more apparent from the following detailed description taken in conjunction with the accompanying drawings, in which like reference numerals designate identical or similar elements, directions such as "leftward", "clockwise" and "upper" refer to those as shown in the respective drawings, and in which:

FIG. 1 is a longitudinal sectional view of a preferred embodiment of a governor assembly according to the invention; and FIGS. 2 to 5 are graphical explanatory views of the embodiment of FIG. 1 corresponding to various operating conditions thereof.

Referring now to FIG. 1, a governor assembly of the invention is shown in a rest condition, in which the rotational speed of an associated supercharged Diesel engine (not shown) is zero, and the output pressure of an associated engine air supercharger (not shown) is also zero. A centrifugal governor 10 constituting part of the governor assembly comprises an input shaft 12 driven from the engine by a camshaft (not shown) at a speed equal to or proportional to the engine speed. The centrifugal governor 10 also comprises a flyweight assembly 14 and biasing means in the form of springs 16. As the engine speed increases, the upper and lower flyweights 14 are rotated clockwise and counterclockwise respectively against the force of the springs 16 to axially move a sleeve 18 leftward to a degree proportional to the engine speed.

A control rod 20 is operatively connected to a fuel injection pump (not shown) of the Diesel engine to control the volume of fuel injected therefrom into the engine. The control rod 20 may have a rack (not shown) fixed thereto engaging with control quadrants of control sleeves of plungers (not shown) communicating with the fuel injection pump, or be connected to control the fuel injection pump in any other manner.

The control rod 20 is shown in a position of maximum fuel injection volume, and is movable in the direction of an arrow A (rightward) to decrease the fuel injection volume. As mentioned above, it is desirable to provide maximum fuel injection volume for starting the engine. The control rod 20 is operatively connected to the centrifugal governor 10 by a second linkage (no numeral) consisting of a control lever 22, a shifter rod 24 and yieldable means in the form of a resilient member which may be a compression spring 26 as shown. The control lever 22 is pivotably connected at one end to the control rod 20, and has an intermediate pivot point 28. The other end of the control lever 22 has a slot (no numeral) formed therethrough to allow pivotal connection with a pin (no numeral) fixed to an intermediate point on the shifter rod 24. The spring 26 is disposed in the sleeve 18, and urges the left end of the shifter rod 24 in a direction (rightward) to urge the control rod 20 through the control lever 22 toward the position of maximum fuel injection volume as shown. The left end portion of the shifter rod 24 is axially slidable in the sleeve 18, and a stopper 30 is provided to limit movement of the shifter rod 24 in the direction in which it is urged by the spring 26.

The pivot point 28 may be embodied by an eccentric portion of a shaft connected to a manual speed control member such as an accelerator pedal (not shown), to control the engine speed. The scope of the invention also includes any other means of manually actuating the second linkage to control the engine speed. If, for example, the pivot point 28 is in the form of an eccentric portion of a shaft, as the shaft is rotated, the control lever 22 will be swung about the pin of the shifter rod 24 to move the control rod 20 leftward or rightward.

A pressure sensitive means 32 includes a diaphragm 34 having a diaphragm rod 36 fixed to the center thereof. A chamber 38 is exposed to supercharged air from the supercharger through an inlet 40, and a chamber 42 is exposed to atmospheric air through a vent 44. Movement of the diaphragm 34 is transmitted through the diaphragm rod 36 to a diaphragm lever 46, which pivots about a fixed point 48. An engaging arm 50 is rigidly connected to a connecting link 52 by means such as a bolt 50a. The connecting link 52 and thus the engaging arm 50 are pivotably connected to the diaphragm lever 46 by a pivot pin 54. The engaging arm 50 is formed with an elongated longitudinal slot 56. The diaphragm lever 46 is biased counterclockwise by a diaphragm spring 47, and adjustment means 49 are provided to set the preload of the spring 47.

A first linkage (no numeral) includes an actuating lever 58 which is pivotal about a fixed point 60. The upper end of the actuating lever carries a pin 62 which slides in the elongated slot 56 of the engaging arm 50. The bottom left end of the actuating lever 58 is engageable with the right end of the shifter rod 24 as shown, and the actuating lever 58 is urged in a clockwise direction by biasing means such as a compression spring 64. The engaging arm 50 has a pawl or engaging portion 66, which is engageable with a pawl or engaging portion 68 of the control rod 20. The shifter rod 24, actuating lever 58, engaging arm 50 and engaging portions 66 and 68 constitute means for automatically rendering the pressure sensitive means 32 engageable with the control rod 20 to limit the leftward movement thereof as will be described in detail, which is an important and essential feature of the present invention.

If the spring 26 was omitted from the second linkage, as will now be assumed for explanatory purposes, and the shifter rod 24 was rigidly fixed to the sleeve 18, the centrifugal governor 10, second linkage and control rod 20 would constitute a known centrifugal governor assembly. If these elements were, for example, in the positions shown in FIG. 3 which represents medium speed operation of the engine, and the accelerator pedal were depressed to increase the engine speed, the control lever 22 would be rotated counterclockwise about the pin of the shifter rod 24 by movement of the pivot point 28 (eccentric portion of the eccentric shaft). The control rod 20 would thus be moved leftward to increase the fuel injection volume to accelerate the engine. As the engine speed increased to the desired level, the upper and lower flyweights 14 would be rotated clockwise and counterclockwise respectively by centrifugal force to move the sleeve 18 and shifter rod 24 leftward. This would result in clockwise rotation of the control lever 22 about the pivot point 28 (eccentric portion of the eccentric shaft) to move the control rod 20 rightward to decrease the fuel injection volume and maintain the engine at the desired speed.

Reference will now be made to FIGS. 2 to 5, with the governor assembly of the invention assumed as being complete as described above with reference to FIG. 1.

Figure 2:
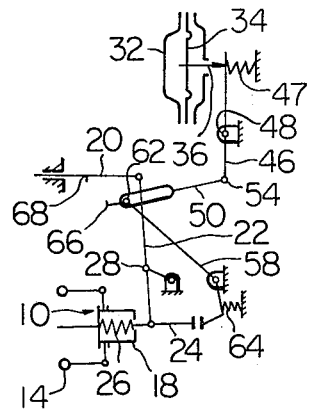

FIG. 2 is similar to FIG. 1 in that it shows the governor assembly in a rest position in preparation for starting the engine. Since the engine speed is zero, there is no centrifugal force acting on the flyweight assembly 14, and the sleeve 18 and shifter rod 24 are in maximum rightward positions. The control lever 22 is thereby rotated to its maximum counterclockwise position with the result that the control rod 20 is moved to its maximum leftward position or the position of maximum fuel injection volume. The engaging portions of the engaging arm 50 and control rod 20 are not engageable in this condition, as will be better understood later, and the maximum fuel injection volume is provided for starting the engine.

Figure 3:
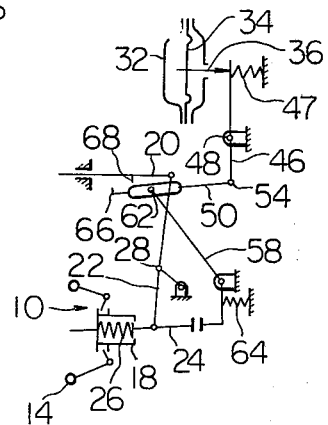

In FIG. 3, the engine has been started and the engine speed has risen above a predetermined value which may be a minimum idling speed. In this condition, the shifter rod 24 has been moved leftward by the centrifugal governor 10, resulting in rightward movement of the control rod 20 to decrease the fuel injection volume to an efficient level. Also, the actuating arm 58, which was held in a maximum counterclockwise position in FIG. 2 through engagement of the right end of the shifter rod 24 with the bottom left end of the actuating arm 58, is allowed to be rotated clockwise by the force of the spring 64 since the shifter rod 24 has moved leftward. This results in clockwise rotation of the engaging arm 50 about the pivot pin 54 to an orientation substantially parallel to the control rod 20. This is because the clockwise displacement of the pin 62 of the actuating lever 58 has a vertical component, and the engaging arm 50 is moved upward by the pin 62. The engaging portions of the engaging arm 50 and the control rod 20 are thus rendered engageable, and it will be noticed that the actuating lever 58 is a bell crank lever to convert horizontal movement of the shifter rod 24 into vertical movement of the engaging arm 50 to render the pressure sensitive means 32 engageable with the control rod 20 when the engine speed is above the predetermined value.

In the condition shown in FIG. 3, horizontal movement of the diaphragm 34 and diaphragm rod 36 will be converted to rotation of the diaphragm lever 46 about the pivot point 48. The resulting circular movement of the pivot pin 54 will result in approximately linear movement of the engaging arm 50 parallel to the control rod 20, since movement of the engaging arm 50 is guided by means of the elongated slot 56 and pin 62. Thus, the position of the engaging portion 66 of the engaging arm will be a predetermined function of the pressure of the supercharged air being supplied into the engine. For example, if the supercharged air pressure is increased, the engaging arm 50 and thus its engaging portion 66 will be moved leftward toward the position of maximum fuel injection volume, indicating that more fuel may be introduced into the enging due to the increased supply of air for combustion therewith.

Figure 4:
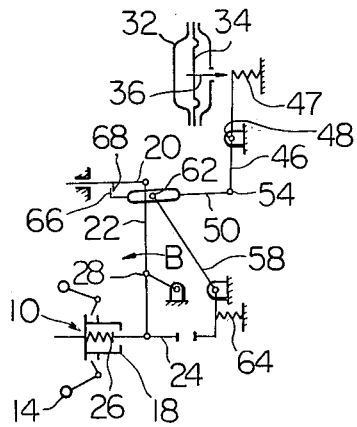
Figure 5:
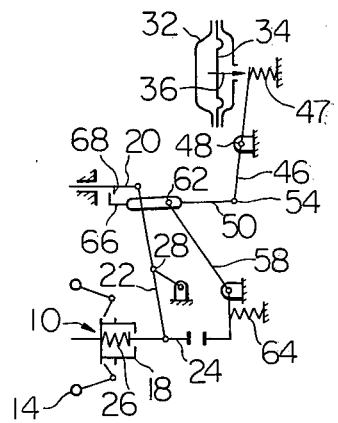

FIGS. 4 and 5 represent a condition in which the engine is accelerated from the condition of FIG. 3. In FIG. 4, the eccentric portion of the eccentric shaft (pivot point 28) has been rotated in the direction of an arrow B in response to depression of the accelerator pedal to accelerate the engine. This resulted in counterclockwise rotation of the control lever 22 about the pin of the shifter rod 24 and leftward movement of the control rod 20 to increase the fuel injection volume. However, when the control rod 20 reached the position shown in which the fuel injection volume was such that maximum power was obtainable from the engine without producing smoky exhaust gases, further leftward movement of the control rod 20 was prevented through engagement of the engaging portion 68 with the engaging portion 66. Since leftward movement of the control rod 20 was limited, further rotation of the pivot point 28 in the direction of the arrow B resulted in clockwise rotation of the control lever 22 about the pivotal connection point (no numeral) of the control lever 22 and control rod 20. The subsequent result was a force applied to the shifter rod 24 to move it leftward. Due to the provision of the spring 26, the shifter rod 24 was allowed to move leftward against the force of the spring 26. It will be understood that the stiffness of the spring 26 is selected so that the spring 26 will yield only when the engaging portions of the control rod 20 and control lever 22 are in engagement to absorb further movement of the first linkage and prevent breakage thereof. The stiffness of the spring 16 is greater than that of the spring 26, which is in turn greater than that of the spring 64.

Other effects which could cause engagement of the engaging portions 66 and 68 from the condition of FIG. 3 are a decrease in supercharged air pressure (which would move the engaging arm 50 rightward) and/or a decrease in engine speed (which would move the control rod 20 leftward). The key point is that the maximum fuel injection volume which can be injected into the engine without producing smoky exhaust gases is a function of the supercharged air pressure, and the position of the engaging portion 66 of the engaging arm 50 corresponds to this volume. Thus, leftward movement of the control rod 20 to increase the fuel injection volume is limited by the pressure sensitive means 32 as a predetermined function of supercharged air pressure.

FIG. 5 shows the result of the acceleration demand condition of FIG. 4. The engine speed has increased moving the control rod 20 rightward, and the supercharged air pressure has increased moving the engaging arm 50 leftward. The engaging portions 66 and 68 thus disengage, and leftward movement of the control rod 20 is no longer limited by the pressure sensitive means 32 since the demanded fuel injection volume is less than the above described maximum value.

As clearly described above, a governor assembly of the invention greatly contributes to fuel economy and pollution control by providing a maximum fuel injection volume for starting, and automatically reducing the fuel injection volume as soon as the engine is started. The governor assembly also limits the fuel injection volume to a level at which smoky exhaust gases are not produced. If desired, a governor assembly of the invention may be used with a single speed Diesel engine, in which case the pivot point 28 would be fixed and the governor assembly would respond only to changes in engine loading.

Although a governor assembly of the invention is ideally suited for a supercharged Diesel engine and has been described as being applied thereto, the pressure sensitive means 32 may be arranged to respond to negative engine induction air pressure, in which case the governor assembly could be used with a non-supercharged Diesel engine. Also, it is clear to one skilled in the art that the scope of the invention disclosed herein also includes application involving supercharged or non-supercharged fuel injected gasoline or other internal combustion engines.

What is claimed is:

1. In an internal combustion engine having a fuel injection pump, a governor assembly for said injection pump, said governor assembly comprising:

a control rod operatively connected to the fuel injection pump and movable from a position to provide maximum fuel injection volume for starting the engine in a direction to decrease the fuel injection volume;

a centrifugal governor driven from the engine and operatively connected to said control rod to urge said control rod from said position of maximum fuel injection volume at zero engine speed in said direction to decrease the fuel injection volume according to a predetermined function of engine speed;

pressure-sensitive means responsive to an engine induction air pressure and operative to limit movement of said control rod toward said position of maximum fuel injection volume to a position corresponding to a predetermined maximum fuel injection volume corresponding to sensed induction air pressure when connected to said control rod;

a first linkage engageable with said centrifugal governor and arranged to connect said pressure sensitive means to said control rod only when sensed engine speed is above a predetermined value; and a second linkage to operatively connect said centrifugal governor to said control rod, including yieldable means arranged to yield only when movement of said control rod is being limited by said pressure-sensitive means to prevent breakage of said governor assembly.

2. A governor assembly according to claim 1, in which the internal combustion engine is a supercharged Diesel engine, and the induction air pressure sensed by said pressure-sensitive means is the pressure of supercharged air being supplied into the engine.

3. A governor assembly according to claim 1, in which said second linkage is manually actuable to control the engine speed.

4. A governor assembly according to claim 1, in which said control rod has an engaging portion, and which comprises an engaging arm operatively connected to said pressure sensitive means; said engaging arm having an engaging portion engageable with said engaging portion of said control rod to limit movement of said control rod toward said position of maximum fuel injection volume.

5. A governor assembly according to claim 4, in which said centrifugal governor includes a flyweight assembly and a sleeve, and is arranged to axially move said sleeve in proportion to the engine speed;

said sleeve being connected to said second linkage to urge said control rod in said direction to decrease the fuel injection volume as the engine speed increases.

6. A governor assembly according to claim 5, in which said second linkage includes;

a shifter rod having an end portion axially slidable within said sleeve and the other end engageable with said first linkage;

a control lever having one end rotatably connected to an intermediate portion of said shifter rod, the other end rotatably connected to said control rod and an intermediate pivot point; and in which said yieldable means is a resilient member disposed within said sleeve to urge said shifter rod in a direction to urge said control lever and thus said control rod toward said position of maximum fuel injection volume; and in which said sleeve includes a stopper to limit movement of said shifter rod in the direction in which it is urged by said resilient member.

7. A governor assembly according to claim 6, in which said engaging arm is movable by said pressure-sensitive means substantially parallel to said control rod when rendered engageable with said control rod by said first linkage, and the position of said engaging portion of said engaging arm corresponds to said predetermined maximum fuel injection volume at the sensed induction air pressure;

said predetermined maximum fuel injection volume being provided when said engaging portion of said control rod engages with said engaging portion of said engaging arm to limit movement of said control rod toward said position of maximum fuel injection volume.

8. A governor assembly according to claim 7, in which said engaging arm has a slot formed therethrough, and in which said first linkage includes;

an actuating lever having a fixed intermediate pivot point and a pin at one end thereof slidable in said slot of said engaging arm, the other end of said actuating lever being engageable with said other end of said shifter rod;

said shifter rod moving said engaging arm through said actuating lever into position to be movable substantially parallel to said control by said pressure-sensitive means when the enging speed is above said predetermined value, and moving said engaging arm to a position of disengagement with said control rod when the engine speed is below said predetermined value.

9. A governor assembly according to claim 8, in which said first linkage includes biasing means to urge said actuating lever in a direction to move said engaging arm into position to be movable substantially parallel to said control rod.

10. A governor assembly according to claim 9, in which the position of said intermediate pivot point of said control lever is manually selectable to control the engine speed.

11. A governor assembly according to claim 10, in which said centrifugal governor includes biasing means to urge said flyweight assembly in a direction to urge said control rod toward said position of maximum fuel injection volume, and in which the stiffness of said biasing means of said centrifugal governor is greater than the stiffness of said resilient member disposed in said sleeve, which is in turn greater than the stiffness of said biasing means of said actuating lever.

12. A governor assembly according to claim 11, in which said pressure-sensitive means includes a diaphragm exposed to the engine induction air pressure, a diaphragm lever connecting said diaphragm to said engaging arm, a spring urging said engaging arm through said diaphragm lever in said direction to decrease the fuel injection volume, and adjustment means to allow manual adjustment of the preload of said spring.

* * * * *